United States Patent Office 3,245,953  
Patented Apr. 12, 1966

3,245,953
PREPARATION OF POLYMERS CONTAINING A DOUBLY BRIDGED BERYLLIUM ATOM
Burton Peter Block, Wayne, and Charles W. Schaumann, Havertown, Pa., assignors to Pennsalt Chemicals Corporation, Philadelphia, Pa., a corporation of Pennsylvania
No Drawing. Filed June 14, 1963, Ser. No. 287,751
5 Claims. (Cl. 260—63)

This invention relates to an improved process for making inorganic polymers involving a doubly bridged beryllium atom and having the recurring units of structure

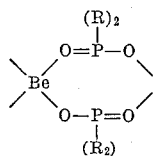

wherein the R groups are selected from the group consisting of hydrocarbon alkyl, cycloalkyl and aryl groups containing from one to twelve carbon atoms.

Inorganic polymers having the above structure are disclosed and claimed in the application of Block, Simkin, Roth and Rose filed on February 19, 1963, and identified as Serial No. 259,715. The subject matter of that application embodies inorganic polymers wherein the metal in the backbone is a bivalent tetrahedral metal characterized by having a coordination number of four in the +2 oxidation state, and such metals include bivalent zinc, beryllium, cobalt, manganese, mercury, nickel, iron and cadmium. The polymers and copolymers of S.N. 259,715, as can be seen from the structure of the repeating unit, contain an eight membered ring formed between the tetrahedral metals and the two bridging groups. Such polymers and copolymers are useful as coatings and for molding into gaskets, O-rings and the like.

It has been found, however, that in the case of the polymer where beryllium is the bivalent tetrahedral metal, an improved process for making the polymers is achieved by a fusion reaction wherein solid beryllium acetylacetonate is heated with a molar excess of a phosphinic acid. Thus in accord with this invention a dry fusion mass comprising beryllium acetyl+acetonate and a molar excess of a phosphinic acid having the structure $R_2P(O)OH$ substantially non-volatile at the reaction conditions where R is a hydrocarbon alkyl, cycloalkyl or aryl radical as defined above is heated at a temperature between about 75° and about 250° C. while maintaining the reaction mass at atmospheric pressure or below.

The chelating or bridging groups of the polymer comprise the anion of an acid $R_2P(O)OH$ which is based on the group of phosphinic acids. It is evident that in forming the polymer backbone by bridging the beryllium atom with the phosphinate anion, there remain two valence bonds of the phosphorus atom and these are satisfied with the two R groups which may be the same or different groups selected from the group consisting of hydrocarbon alkyl, cycloalkyl and aryl radicals containing from one to twelve carbon atoms. The phosphinic acids useful in this invention are those of the formula given above which are substantially non-volatile at reaction temperatures and pressures. Thus, phosphinic acids such as dimethylphosphinic acid are too volatile to be useful in the process, but any phosphinic acid of the above structure containing at least one group having more than one carbon atom is useful. Dialkyl phosphinic acids such as diethyl, methylethyl, dibutyl, di-n-hexyl, di-octyl, octyldecyl, di-dodecyl and dicyclohexyl phosphinic acids are substantially non-volatile at reaction conditions and may be used. Other useful phosphinic acids containing aryl groups include diphenylphosphinic, dinaphthylphosphinic, methylphenylphosphinic, phenylethylphosphinic, phenylnaphthylphosphinic, t-butylphenylphosphinic, hexylphenylphosphinic, ethylnaphthylphosphinic, and the like. Many of these phosphinic acids are disclosed by Kosolapoff in his book "Organophosphorus Compounds," John Wiley, 1950. It will be understood that a mixture of different phosphinic acids may be used in the process of this invention whereby the product polymer is a copolymer in that it contains non-uniform bridging groups.

As indicated, the proportion of phosphinic acid taken together with the beryllium acetylacetonate will be such that the phosphinic acid is in molar excess. When a 1:1 molar ratio is used, there is a tendency for some polymer to be formed, but the yield is so low as to be impractical. In general, the mole ratio of phosphinic acid to beryllium acetylacetonate will be between about 2:1 and about 6:1, although a molar ratio of about 4:1 is preferred.

The temperature at which the reaction is carried out is preferably between about 75° and 100° C., although higher temperatures may be used. Higher temperatures will be used when the mole ratio is below about 4:1 and the temperature range may extend to about 250° C. under these conditions.

The reaction process will be carried out at atmospheric pressure or at lower pressures. The pressure conditions for the reaction are dictated by the need to volatilize the acetylacetone by-product from the reaction mass and for this reason the reaction will usually be carried out under vacuum conditions. However, when mole ratios of phosphinic acid to beryllium acetylacetonate are below 2:1, temperatures on the order of 200° to 250° C. are required to disproportionate any dimeric product which is formed and at these higher temperatures, pressures at or near atmospheric will be used. Generally, however, at the preferred mole ratios, the pressure will be less than atmospheric and the usual pressure at which the reaction is carried out will be on the order of 0.05 to 10 mm. of mercury.

When the reaction is completed, as indicated by no further acetylacetone being volatilized, the reaction mass is cooled and extracted with an organic solvent such as a lower aliphatic alcohol or ketone (e.g. ethanol, acetone, methylethylketone, etc.) thereby leaving the insoluble organic polymer behind. By the procedure outlined above yields on the order of 80% to 90% (based on the beryllium used) are readily obtained.

The following examples will serve to illustrate the invention further.

*Example 1*

A well-ground mixture of 5.0 g. of

and 21.0 g. of $(C_6H_5)_2P(O)OH$ is heated to 100° C. in a microdistillation apparatus at 1 mm. Hg pressure for 3.5 hr. The mixture is cooled, the sublimed beryllium acetylacetonate collected and added to the reaction mass and all of the solid reground and is reheated under the same conditions. This procedure is again repeated and the solid product is then extracted with $C_2H_5OH$ in a Soxhlet extractor for 65 hr. The dried product weighs 8.6 g. and analyzes 2.25% Be, 14.09% P, 65.43% C, and 4.60% H; calculated for $$Be(OP(C_6H_5)_2O)_2$$

2.03% Be, 13.98% P, 65.20% C, and 4.54% H.

*Example 2*

A mixture of 5.0 g. of 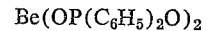 and 31.55 g. of $(C_6H_5)_2P(O)OH$ is treated in a similar fashion except that the pressure is at 0.5–0.7 mm. Hg and the temperature at 120–130° C. The product weighs 9.9 g. and analyzes 2.2% Be, 14.4% P, 61.33% C and 4.36% H.

*Example 3*

A mixture of 9.5 g. of $Be(CH_3COCHCOCH_3)_2$ and 20.0 g. of $(C_6H_5)_2P(O)OH$ is also treated as in Example 1 except that the pressure is 0.2–0.4 mm. Hg. After the first heating at 100° C. for about 3.5 hr., the mixture is subsequently heated at 115° C. The yield is 18.0 g. of product analyzing 2.2% Be, 14.6% P, 64.79% C and 6.33% H.

*Example 4*

When Example 1 is repeated with methylphenylphosphinic acid, the product obtained is

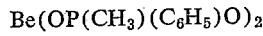
$Be(OP(CH_3)(C_6H_5)O)_2$

Likewise, diethylphosphinic acid, dicyclohexylphosphinic acid, propylphenylphosphinic acid and t-butylphenylphosphinic acid may be used in the same manner with equivalent results.

*Example 5*

A well-ground mixture of 9.5 g. of

$Be(CH_3COCHCOCH_3)_2$ and 20.0 g. of $(C_6H_5)_2P(O)OH$ is placed in a 250 ml. round bottom flask attached to a microdistillation apparatus and is heated to 240°–250° C. for 7 hr. at atmospheric pressure. The residue is then cooled, ground and reheated. No further acetylacetone distills out of the mixture. The cooled residue is then extracted with acetone for 48 hr. and is dried to constant weight. There results 19.1 g. of polymeric product having the repeating unit $Be(OP(C_6H_5)_2O)_2$. Analysis: 64.5% C, 4.0% H, 16.3% P and 1.6% Be.

The products obtained by the above examples are high molecular weight polymers having molecular weights on the order of 10,000 or higher. They are extremely insoluble in water and organic solvents.

It will be understood that numerous changes and modifications may be made from the above description and examples without departing from the spirit and scope of the invention.

We claim:
1. The process of making a polymer having an inorganic backbone consisting of a doubly bridged beryllium atom wherein each of said bridging groups is the anion of an acid $R_2P(O)OH$ where R is selected from the group consisting of hydrocarbon alkyl, cycloalkyl and aryl groups containing from one to twelve carbon atoms, which comprises heating a solid mixture of beryllium acetylacetonate and a molar excess of a phosphinic acid of structure $R_2P(O)OH$ as defined above at a temperature between about 75° and about 250° C. at a pressure between about 0.05 mm. Hg and about 1 atmosphere, said phosphinic acid being substantially non-volatile at reaction conditions.

2. The process of claim 1 wherein the mole ratio of phosphinic acid to beryllium acetylacetonate is between about 2:1 and about 6:1.

3. The process of making a polymer having an inorganic backbone consisting of a doubly bridged beryllium atom wherein each of said bridging groups is the anion of an acid $R_2P(O)OH$ where R is selected from the group consisting of hydrocarbon alkyl, cycloalkyl and aryl groups containing from one to twelve carbon atoms, which comprises heating a solid mixture comprising a phosphinic acid of structure $R_2P(O)OH$ as defined above and beryllium acetylacetonate in a mole ratio between about 2:1 and 6:1 at a temperature between about 75° and about 100° C. and at a pressure between 0.05 and 10 mm. Hg, said phosphinic acid being substantially nonvolatile at reaction conditions.

4. The process of claim 3 wherein the phosphinic acid is diphenylphosphinic acid.

5. The process of claim 3 wherein the phosphinic acid is methylphenyl phosphinic acid.

References Cited by the Examiner

Block et al., "Journal American Chemical Society," vol. 84, August 20, 1962, p. 3200–3201.

SAMUEL H. BLECH, *Primary Examiner.*

MURRAY TILLMAN, *Examiner.*